(12) United States Patent
Bryl et al.

(10) Patent No.: US 8,579,102 B2
(45) Date of Patent: Nov. 12, 2013

(54) BELT CLEANING SYSTEM AND METHOD FOR LASER CUTTING DEVICE

(75) Inventors: Derek A. Bryl, Webster, NY (US); Richard P. Ficarra, Williamson, NY (US); Gordon B. Reid, Walworth, NY (US); Richard F. Scarlata, Rochester, NY (US); Thomas C. McGraw, Macedon, NY (US)

(73) Assignee: Xeorx Corporation, Norwalk, CT (US)

( * ) Notice: Subject to any disclaimer, the term of this patent is extended or adjusted under 35 U.S.C. 154(b) by 347 days.

(21) Appl. No.: 12/902,592

(22) Filed: Oct. 12, 2010

(65) Prior Publication Data

US 2012/0085621 A1 Apr. 12, 2012

(51) Int. Cl.
*B65G 47/10* (2006.01)

(52) U.S. Cl.
USPC .......................................... 198/494

(58) Field of Classification Search
USPC .................. 198/493, 494, 495, 499
See application file for complete search history.

(56) References Cited

U.S. PATENT DOCUMENTS

| | | | |
|---|---|---|---|
| 2,018,719 A * | 10/1935 | Haug ........................ | 198/494 |
| 2,525,982 A * | 10/1950 | Wescott .................... | 101/425 |
| 3,270,860 A * | 9/1966 | Siebach ................... | 198/803.14 |
| 3,654,654 A * | 4/1972 | Abreu et al. ............... | 15/1.51 |
| 3,815,728 A * | 6/1974 | Vaughan .................... | 198/495 |
| 4,344,361 A * | 8/1982 | MacPhee et al. ........... | 101/425 |
| 4,755,252 A * | 7/1988 | Held .......................... | 156/389 |
| 4,960,200 A * | 10/1990 | Pierce ....................... | 198/495 |
| 5,613,594 A * | 3/1997 | Kootsouradis ............. | 198/495 |
| 5,797,063 A * | 8/1998 | Umezawa et al. .......... | 399/34 |
| 6,447,609 B1 * | 9/2002 | Potthoff ..................... | 118/70 |
| 6,945,383 B2 * | 9/2005 | Pham ......................... | 198/495 |
| 6,971,503 B2 * | 12/2005 | Thompson ................. | 198/494 |
| 7,225,915 B2 * | 6/2007 | Kelly et al. ................ | 198/495 |
| 7,419,046 B2 * | 9/2008 | Cezary ....................... | 198/495 |
| 7,743,912 B2 * | 6/2010 | Finley ........................ | 198/666 |
| 7,962,081 B2 * | 6/2011 | Russel et al. ............... | 399/325 |
| 2010/0243410 A1 * | 9/2010 | Hall et al. .................. | 198/495 |

* cited by examiner

*Primary Examiner* — Gene Crawford
*Assistant Examiner* — Keith R Campbell
(74) *Attorney, Agent, or Firm* — Alix, Yale & Ristas, LLP

(57) ABSTRACT

A belt cleaning system to clean a conveyor belt carrier surface includes a first cleaning assembly having a cleaning web sub-assembly. The cleaning web sub-assembly includes a supply roller, a take-up roller, a cleaning web and an applicator. The cleaning web extends from a supply of clean cleaning web wound on the supply roller to the take-up roller. The applicator is disposed intermediate the supply roller and the take-up roller to bias the cleaning web into contact with the conveyor belt carrier surface. The belt cleaning system may also include a second cleaning assembly positioned after the first cleaning assembly in the direction of travel of the conveyor belt. The cleaning webs of the first and second cleaning web sub-assemblies may be dry or wetted with a cleaning liquid.

15 Claims, 9 Drawing Sheets

BELT CLEANING SYSTEM AND METHOD FOR LASER CUTTING DEVICE

BACKGROUND

This disclosure relates generally to apparatus for laser cutting of paper. More particularly, the present disclosure relates to conveyor belts used to transport paper articles to and from a laser cutting device.

Paper debris and contamination build up on the laser cutting vacuum transport belt. The laser heats up the debris on following passes which in turn bakes the debris onto the transport belt, the baked-on debris absorbing extra energy, warping the belt, burning through the belt, and causing the belt causing to fail prematurely.

A conventional approach to solving this problem is to clean the belt periodically by hand or with a mechanical activated scraper blade while the machine is running. However, the debris builds up between cleansing, the belt warps, becomes tacky, and documents become difficult to remove.

If scraped: 1) debris builds up on the scraping edge of the blade, reducing the effectiveness of the blade; 2) the blade scratches the belt, making it more difficult to remove the contamination; and 3) the blade cannot access the warped areas of the transport belt. If hand cleaned, both the cleaning solution and debris get pulled through the vacuum holes and migrate to the underside of the belt, which in turn can cause drive problems and more belt failures.

SUMMARY

There is provided a belt cleaning system to clean a conveyor belt carrier surface, the system comprising a first cleaning assembly including a cleaning web sub-assembly. The cleaning web sub-assembly includes a supply roller, a take-up roller, a cleaning web and an applicator. The cleaning web extends from a supply of clean cleaning web wound on the supply roller to the take-up roller. The applicator is disposed intermediate the supply roller and the take-up roller to bias the cleaning web into contact with the conveyor belt carrier surface.

The cleaning web sub-assembly may also include a housing, with the supply roller and take-up roller rotatably mounted within a housing.

The cleaning web sub-assembly is removably mounted to the first cleaning assembly.

The applicator has a cylindrical shape and is composed of a foam material or a ceramic material.

The cleaning web may be dry or wetted with a cleaning liquid.

The belt cleaning system may further comprise a second cleaning assembly positioned after the first cleaning assembly in the direction of travel of the conveyor belt. The second cleaning assembly includes a cleaning web sub-assembly having a supply roller, a take-up roller, a cleaning web and an applicator. The cleaning web extends from a supply of clean cleaning web wound on the supply roller to the take-up roller. The applicator is disposed intermediate the supply roller and the take-up roller to bias the cleaning web into contact with the conveyor belt carrier surface.

The cleaning webs of the first and second cleaning web sub-assemblies may be dry. The cleaning webs of the first and second cleaning web sub-assemblies may be wetted with a cleaning liquid. The cleaning web of the first cleaning web sub-assembly may be wetted with a cleaning liquid and the cleaning web of the second cleaning web sub-assembly may be dry.

The belt cleaning system may further comprise a control system, with each of the cleaning assemblies also including a sensor to monitor the supply of cleaning web wound on the supply roller and transmit a cleaning web supply signal to the control system.

The belt cleaning system may further comprise a drive system, where one of the two cleaning assemblies is in operation and another of the two cleaning assembly is in standby, the control system activating the drive system to place the standby cleaning assembly in operation and then place the operating cleaning assembly in standby when the cleaning web supply signal reaches a predetermined level.

The belt cleaning system may further comprise a gravity fed cleaning liquid supply sub-system including a cleaning liquid supply, a receptacle having a holding trough, a supply line providing fluid communication between the cleaning liquid supply and the receptacle trough and a wick having a proximal end portion disposed in the receptacle trough and a distal end portion adapted to contact the cleaning web or the conveyor belt carrier surface. The wick may be composed of a hydroscopic cloth and or synthetic fiber.

The cleaning liquid supply sub-system may also include a spring element adapted to bias the wick distal end portion into engagement with the conveyor belt carrier surface.

The cleaning liquid supply sub-system may also include a reservoir, a reservoir level detector providing a cleaning liquid level indication, a supply line to provide cleaning liquid to the reservoir, a control device disposed in the supply line and a control system in communication with the reservoir level detector and the control device. The control system opens the control device to automatically fill the reservoir when the cleaning liquid level reaches a predetermined value.

There is also provided a method of cleaning a conveyor belt having a carrier surface with a belt cleaning system having a first cleaning assembly including a removable cleaning web sub-assembly. The cleaning web sub-assembly including a supply roller, a take-up roller and a cleaning web extending from a supply of clean cleaning web wound on the supply roller to the take-up roller. The method comprises placing the cleaning system in operation such that the cleaning web of the first cleaning assembly cleans the conveyor belt carrier surface. The supply of clean cleaning web in the first cleaning assembly is monitored and the first cleaning assembly is removed from operation when the supply of clean cleaning web reaches a predetermined level. The cleaning web sub-assembly in the first cleaning assembly is replaced and the first cleaning assembly is placed back in operation.

The cleaning system may also include a second cleaning assembly, with the cleaning web of the second cleaning assembly also cleaning the conveyor belt carrier surface. The supply of clean cleaning web in the second cleaning assembly is monitored and the second cleaning assembly is removed from operation when the supply of clean cleaning web reaches a predetermined level. The cleaning web sub-assembly in the second cleaning assembly is replaced and the second cleaning assembly is placed back in operation. Alternatively, the first cleaning assembly may be placed in operation and the second cleaning assembly placed in standby. When the first cleaning assembly is removed from operation, the second cleaning assembly is placed in operation.

BRIEF DESCRIPTION OF THE DRAWINGS

The present disclosure may be better understood and its numerous objects and advantages will become apparent to those skilled in the art by reference to the accompanying drawings in which.

DETAILED DESCRIPTION

With reference to the drawings wherein like numerals represent like parts throughout the several figures, a belt cleaning system in accordance with the present disclosure is generally designated by the numeral 10. The belt cleaning system 10 may be used for continuously cleaning the web of a conveyor belt, for example a conveyor belt for transporting paper articles to and from a laser cutting device.

Figure 1:
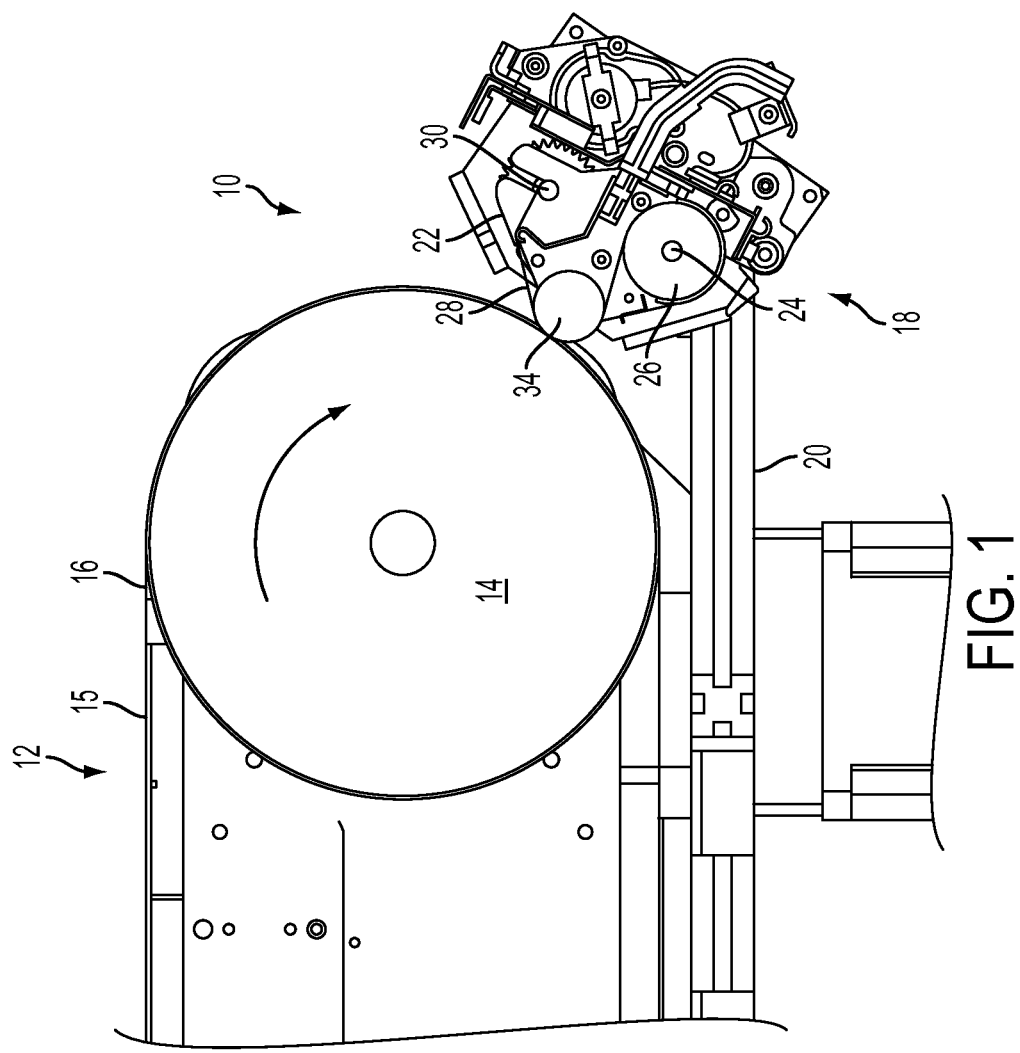
FIG. 1 is a schematic view of a first embodiment of a belt cleaning system in accordance with the present disclosure installed on a conveyor.

Referring first to FIG. 1, a conveyor 12 includes a nose roller 14 about which is wrapped a conveyor belt 16 or web. Positioned closely adjacent the periphery of the roller 14 is the belt cleaning system 10 which spans the width of the nose roller 14. The belt cleaning system 10 substantially continuously cleans the conveyor belt 16, thereby preventing debris from accumulating on the surface 15 of the conveyor belt 16 and removing the debris before it can reach the laser area (not shown). The clean belt surface reflects the laser, preventing laser induced etching and warping found in conventional systems and thereby extending the life of the conveyor belt 16.

Figure 2:
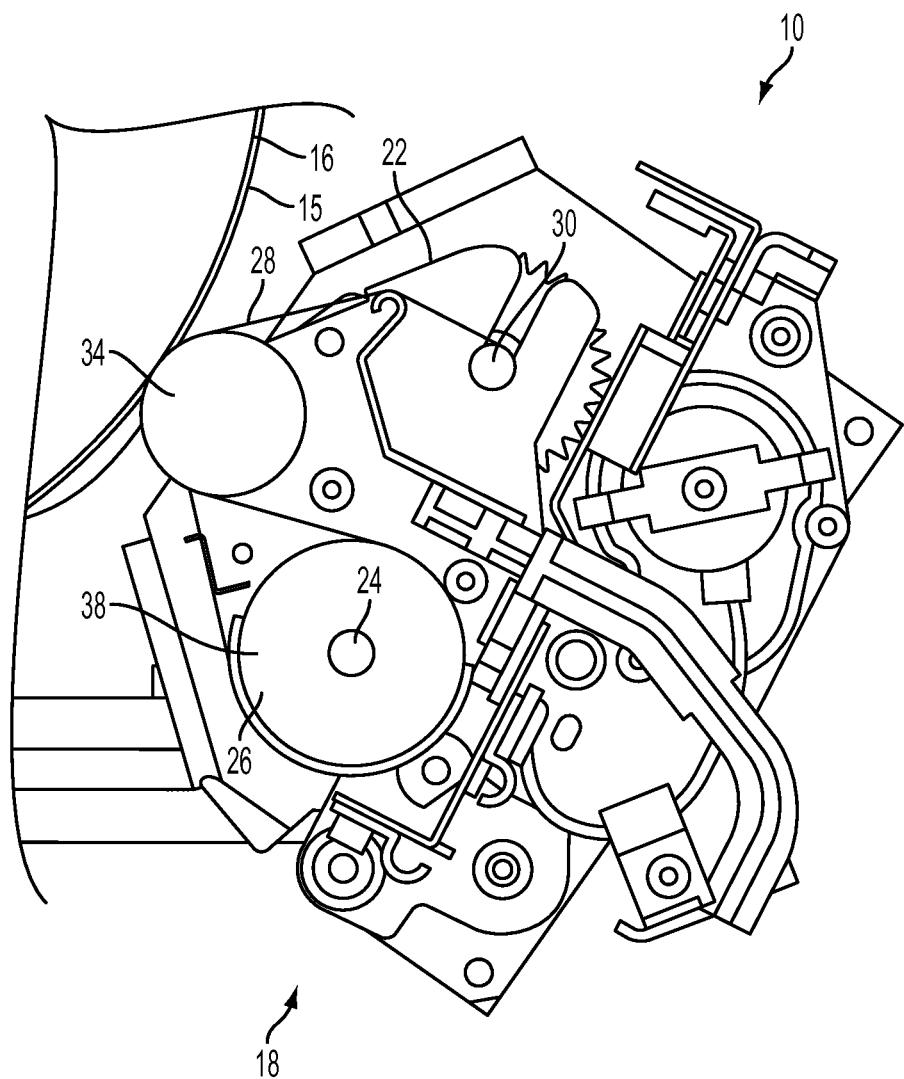
FIG. 2 is an enlarged view of the cleaning assembly of FIG. 1.
Figure 3:
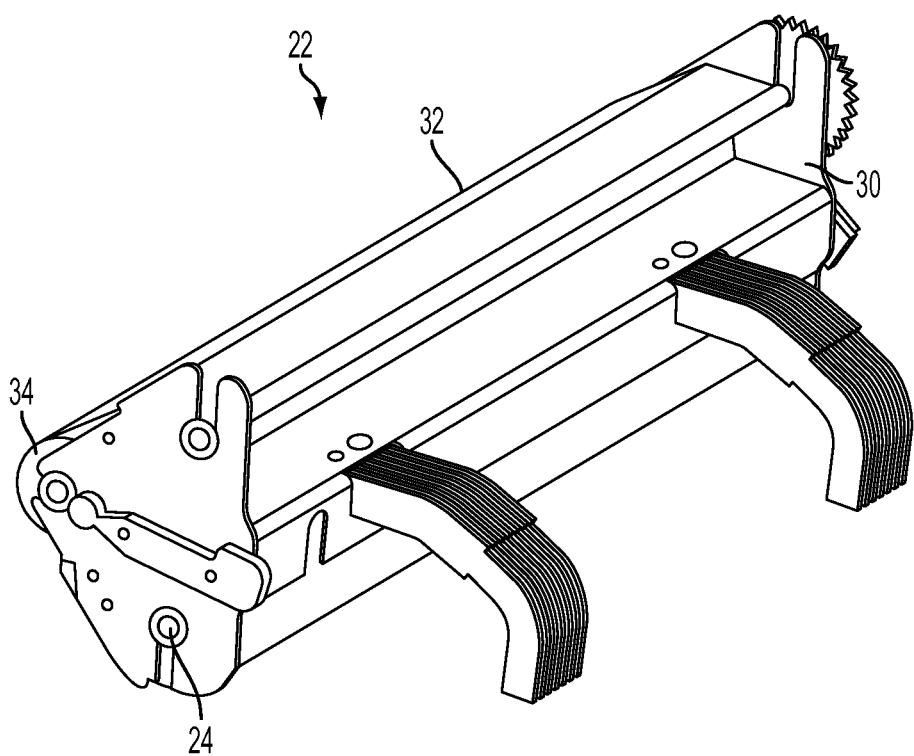
FIG. 3 is an enlarged perspective view of the cleaning web sub-assembly of FIG. 1.

With additional reference to FIGS. 2 and 3, a first embodiment of the belt cleaning system 10 includes a single cleaning assembly 18 that is secured to the conveyor frame 20. The cleaning assembly 18 includes a replaceable cleaning web sub-assembly 22 comprising a supply roller 24 having a roll 26 of cleaning web 28 wound thereon. The cleaning web 28 extends from the supply roller 24 to a take-up roller 30 adapted to receive dirtied cleaning web. The supply roller 24 and take-up roller 30 may be rotatably mounted within a housing 32. An applicator 34 positioned between the supply roller 24 and the take-up roller 30 biases the cleaning web 28 into contact with the conveyor belt surface 15. The cylindrical applicator 34 may be composed of a foam material or a ceramic material. As the conveyor belt 16 turns, the cleaning web 28 moves against it at a relatively slow rate continuously cleaning the belt 16. Debris is wiped from the conveyor belt surface 15, collects on the cleaning web 28, and then transferred to a take-up roller 30. When the roll 26 of cleaning web 28 on the supply roller 24 runs out, the operator removes the spent cleaning web sub-assembly 22 and inserts a new cleaning web sub-assembly 22. In a first variation of this embodiment, the roll 26 of cleaning web 28 is dry. In a second variation of this embodiment, the roll 26 of cleaning web 28 is wet with cleaning liquid 38. In this variation, the housing 32 may include one or more internal barriers to retain a cleaning liquid 38 around the roll 26 of cleaning web 28.

Figure 4:
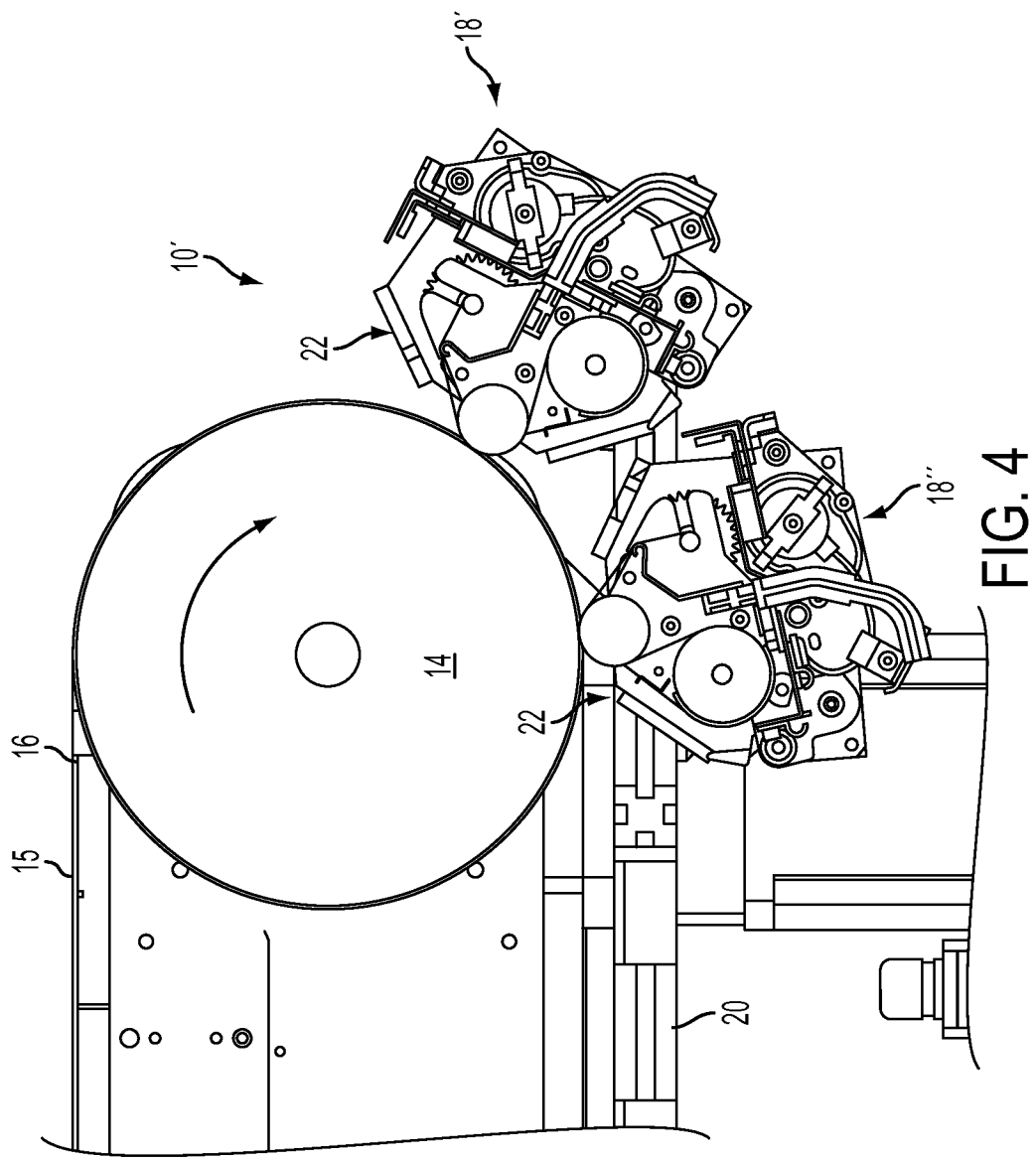
FIG. 4 is a schematic view of a second embodiment of a belt cleaning system in accordance with the present disclosure installed on a conveyor.

With reference to FIG. 4, a second embodiment of the belt cleaning system 10' includes two cleaning assemblies 18', 18" that are secured to the conveyor frame 20. Each of the cleaning assemblies 18', 18" includes a cleaning web sub-assembly 22 comprising a supply roller 24 having a roll 26 of cleaning web 28 wound thereon. The cleaning web 28 extends from the supply roller 24 to a take-up roller 30 adapted to receive dirtied cleaning web. The supply roller 24 and take-up roller 30 may be rotatably mounted within a housing 32. An applicator 34 positioned between the supply roller 24 and the take-up roller 30 biases the cleaning web 28 into contact with the conveyor belt surface 15. In a first variation of this embodiment, the roll 26 of cleaning web 28 in each of the cleaning web sub-assemblies 22 is dry. In a second variation of this embodiment, the roll 26 of cleaning web 28 in each of the cleaning web sub-assemblies 22 is wet. In a third variation of this embodiment, the roll 26 of cleaning web 28 in the first cleaning sub-assembly 18' is wet and the roll 26 of cleaning web 28 in the second cleaning sub-assembly 18" is dry, with the second cleaning sub-assembly 18" being positioned after the first cleaning sub-assembly 18' in the direction of travel of the conveyor belt 16. In this variation, the second cleaning sub-assembly 18" removes debris and cleaning liquid from the conveyor belt surface 15. The housings 32 or the cleaning web sub-assemblies 22 having wet rolls 26 of cleaning web 28 may include one or more internal barriers to retain the cleaning liquid 38 around the roll 26 of cleaning web 28.

Figure 5:
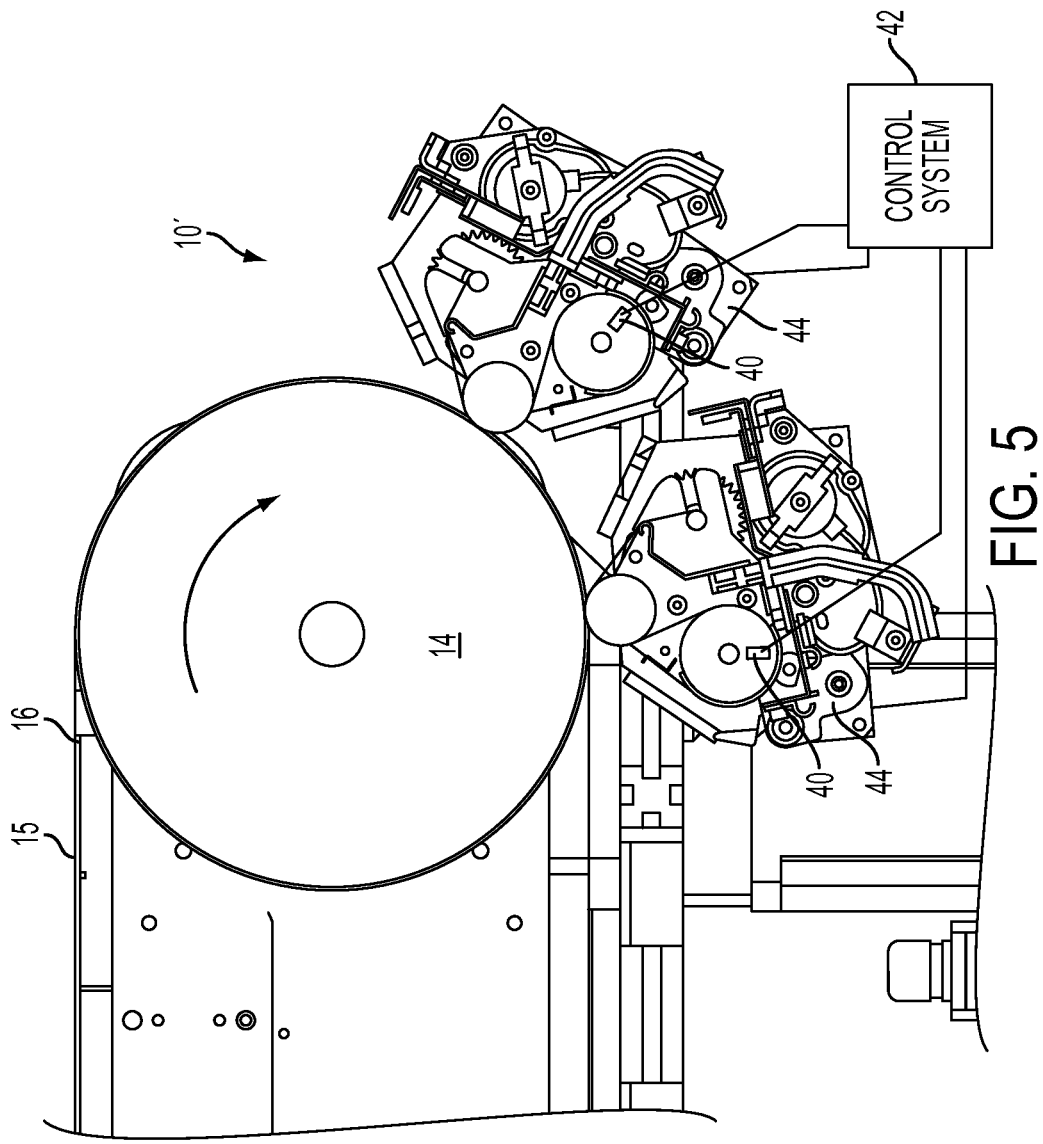
FIG. 5 is a variation of the belt cleaning system of FIG. 4.
Figure 9:
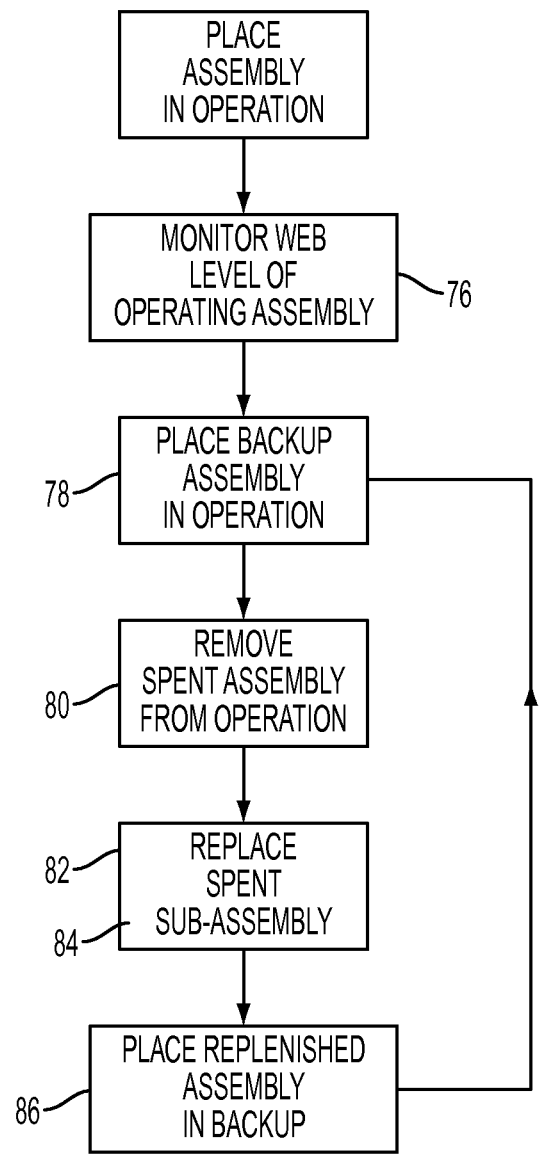
FIG. 9 is a flow diagram of the method of operation of the variation of FIG. 5.

In another variation of the second embodiment (FIGS. 5 and 9), only one of the two cleaning assemblies 18', 18" is normally in operation with the other cleaning assembly 18", 18' in standby. Each of the cleaning assemblies 18', 18" includes a sensor 40 that monitors 76 the amount of cleaning web 28 that is wound on the supply roller 24 and transmits a cleaning web supply signal to a control system 42. When the amount of cleaning web 28 on the supply roller 24 of the operating cleaning assembly 18', 18" is reduced to a predetermined level, the control system 42 automatically utilizes a drive system 44 comprising an electrical mechanical drive, cam or linkage assembly to place 78 the standby cleaning assembly 18", 18' in operation and then remove 80 the cleaning assembly 18', 18" having the spent cleaning web 28 from operation. This allows uninterrupted operation of the conveyor belt 16 with continuous operation of the cleaning system 10' and maximizes productivity. The operator removes 82 the spent cleaning web sub-assembly 22 and inserts 84 a new cleaning web sub-assembly 22, placing 86 the cleaning assembly 18', 18" in standby.

Figure 6:
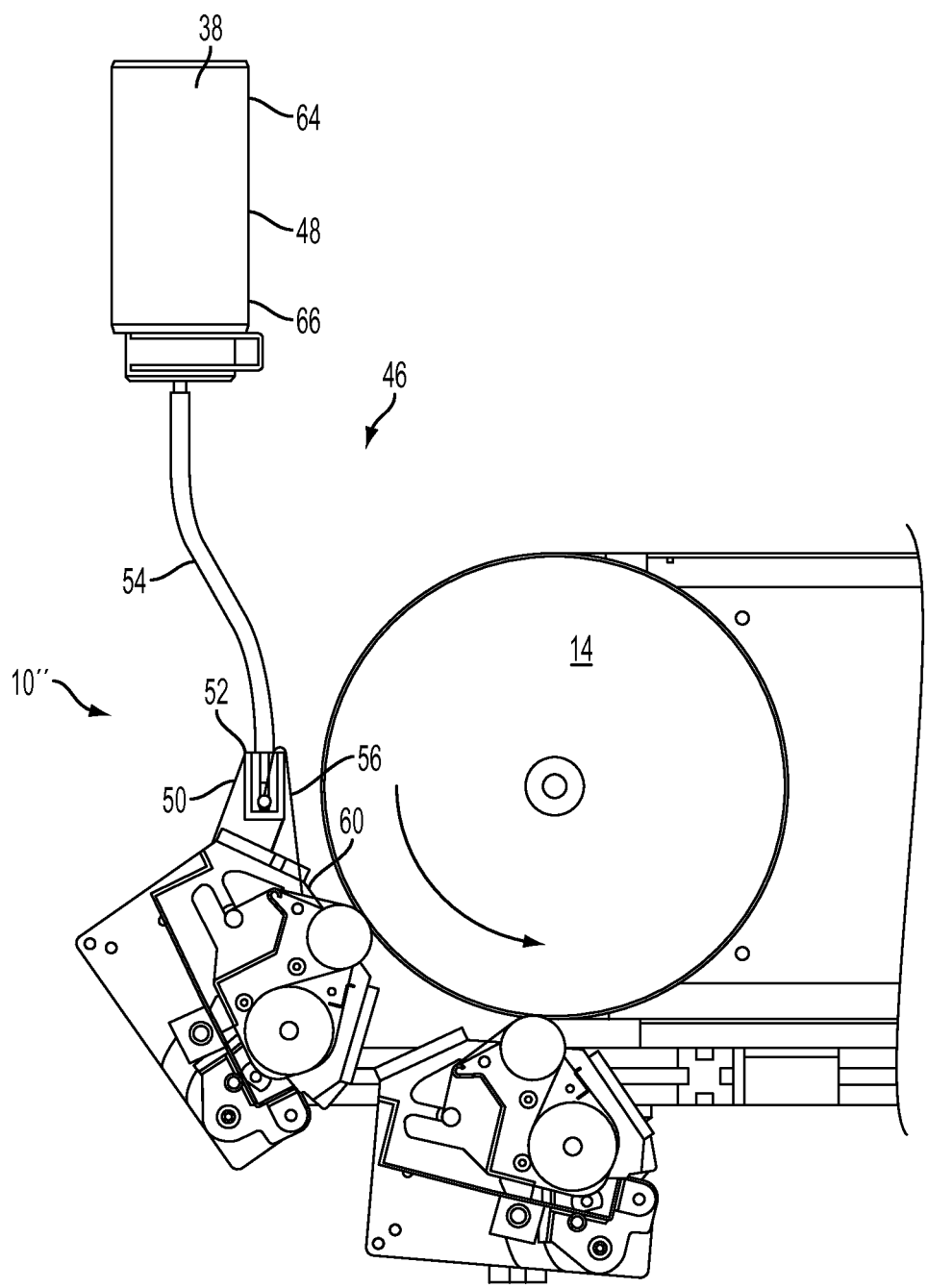
FIG. 6 is a schematic view of a third embodiment of a belt cleaning system in accordance with the present disclosure installed on a conveyor.
Figure 7:
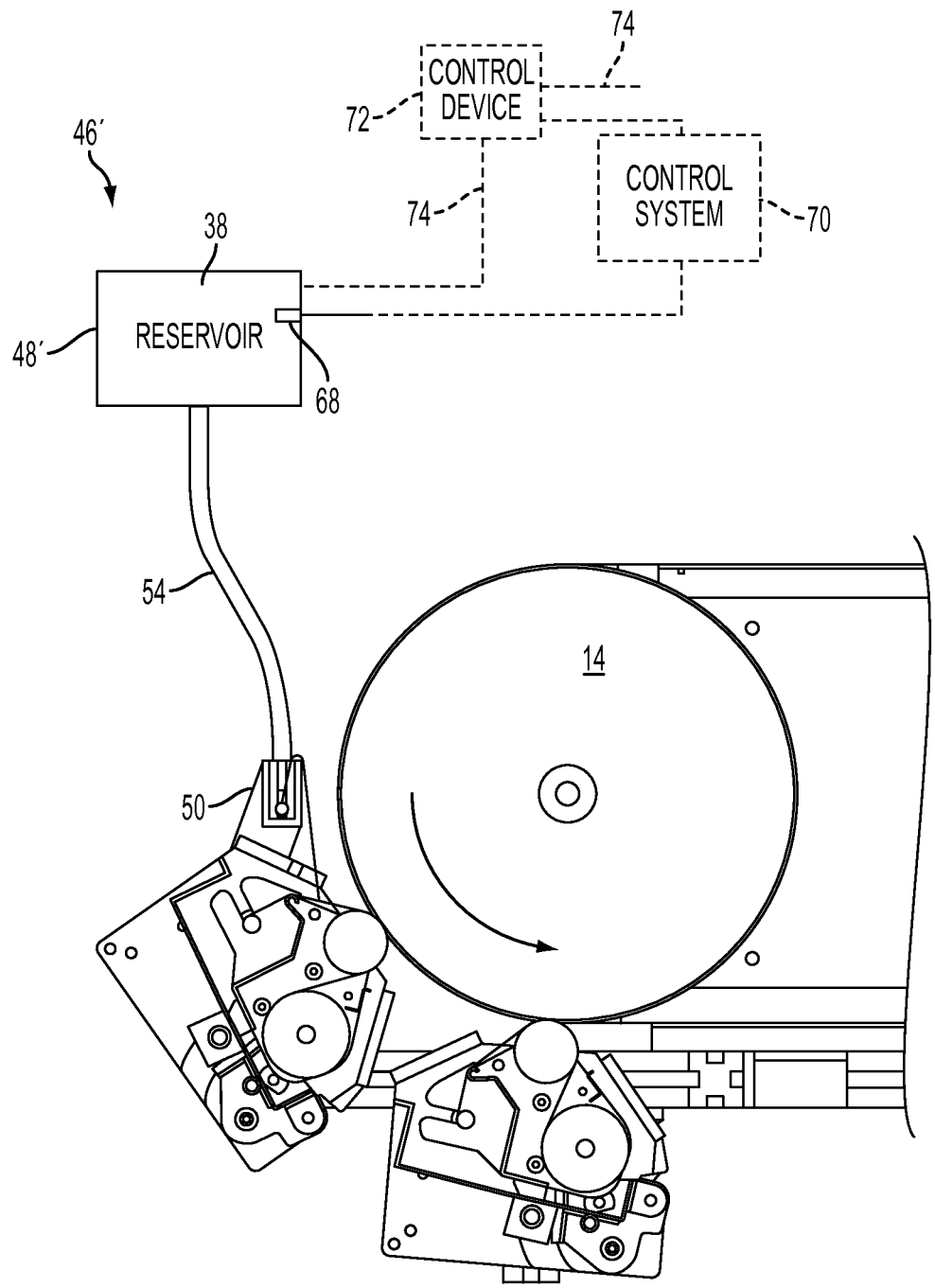
FIG. 7 is a first variation of the belt cleaning system of FIG. 6.
Figure 8:
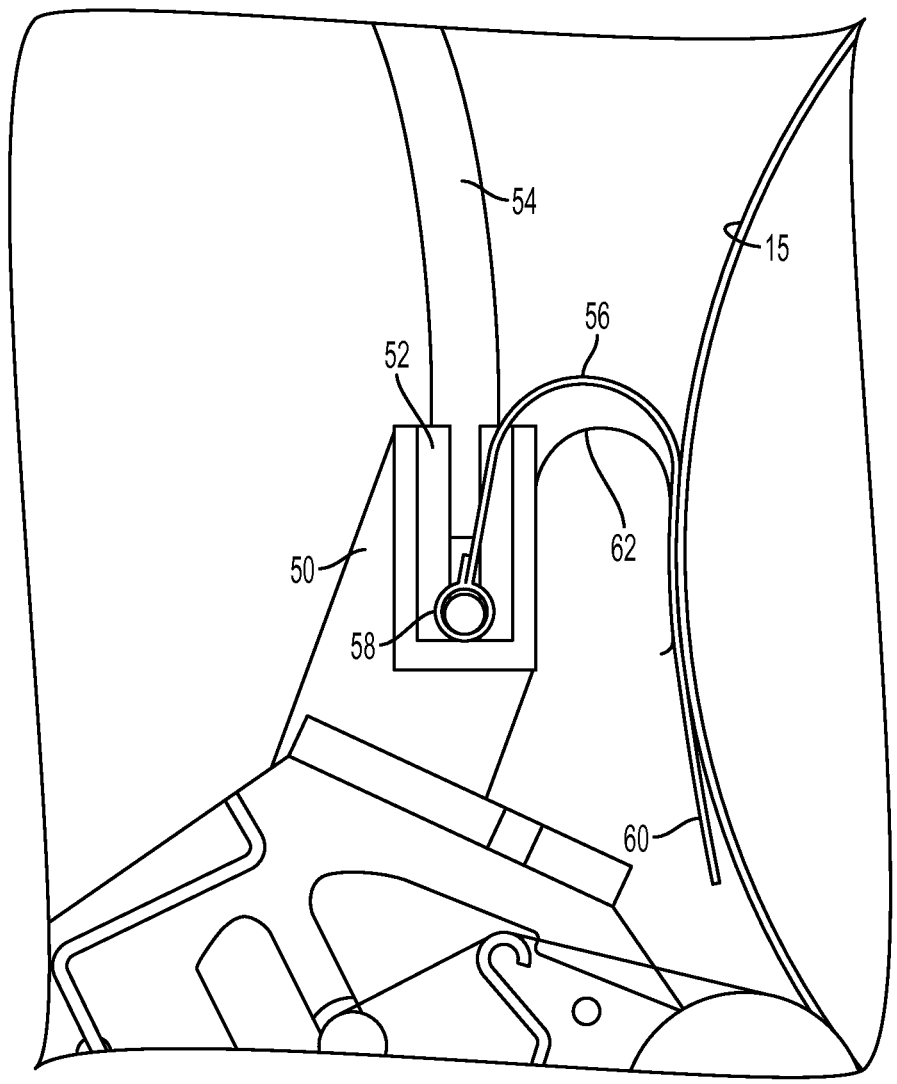
FIG. 8 is a second variation of the belt cleaning system of FIG. 6.

With reference to FIGS. 6-8, a third embodiment of the belt cleaning system 10" includes a gravity fed cleaning liquid supply sub-system 46, 46'. The cleaning liquid supply sub-system 46, 46' includes a cleaning liquid supply 48, 48', a receptacle 50 having a holding trough 52, a supply line 54 providing fluid communication between the cleaning liquid supply 48, 48' and the receptacle 50, and a wick 56 (fabricated from cloth and or synthetic fiber, which is hydroscopic). The cleaning liquid supply sub-system 46, 46' may also include an overflow drip pan adapted to collect excess cleaning liquid. A discharge line connects the drip pan to a sump. The proximal end portion 58 of the wick 56 is positioned in the receptacle trough 52. The distal end portion 60 of the wick 56 may contact the cleaning web 28 (FIGS. 6 and 7). The position of the receptacle 50 and the weight of the wick 56 are sufficient to ensure that the distal end portion 60 of the wick 56 engages the cleaning web 28. Alternatively, the distal end portion 60 of the wick 56 may contact the conveyor belt surface 15 (FIG. 8).

A spring element 62 may be used to bias the distal end portion 60 of the wick 56 into engagement with the conveyor belt surface 15. The cleaning liquid 38 gravity flows from the cleaning liquid supply 48, 48' to the receptacle trough 52 and then through the wick 56 to either the cleaning web 28 or the conveyor belt 16. The presence of a replenishing water supply assures the correct moisture content to clean and also minimizes the need for indexing the web cleaner thereby increasing the useful life of the web cleaner consumable material. The cleaning liquid supply sub-system 46, 46' ensures that there is a consistent supply of cleaning liquid 38 to the cleaning point of contact without the use of motors, pumps or controllers.

In its simplest form, the cleaning liquid supply 48 comprises an inverted translucent bottle, marked with full and refill lines 64, 66 for the operator. A larger reservoir 48' may be used in place of the bottle to reduce the frequency at which the level must be verified or where the supply of cleaning liquid required by the cleaning system exceeds the capacity of the bottle. Alternatively, the cleaning liquid supply may be a reservoir 48' having a level detector 68 that provides a cleaning liquid level signal to a control system 70. This control system 70 may simply provide a warning signal to alert the operator to add cleaning liquid. Alternatively, the control system 70 may control a control device 72 such as a valve or a pump located in a supply line 74 to the reservoir 48' to automatically fill the reservoir 48' when the cleaning liquid 38 reaches a predetermined low level.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A belt cleaning system to clean a conveyor belt having a carrier surface and moving in a direction of travel, the system comprising:
    a first cleaning assembly including a cleaning web sub-assembly including:
        a supply roller;
        a take-up roller;
        a cleaning web extending from a supply of clean cleaning web wound on the supply roller to the take-up roller; and
        an applicator disposed intermediate the supply roller and the take-up roller, the applicator being adapted to bias the cleaning web into contact with the conveyor belt carrier surface; and
    a second cleaning assembly positioned after the first cleaning assembly in the direction of travel of the conveyor belt, the second cleaning assembly including a cleaning web sub-assembly including:
        a supply roller;
        a take-up roller;
        a cleaning web extending from a supply of clean cleaning web wound on the supply roller to the take-up roller; and
        an applicator disposed intermediate the supply roller and the take-up roller, the applicator being adapted to bias the cleaning web into contact with the conveyor belt carrier surface;
    a control system, each of the cleaning assemblies also including a sensor to monitor the supply of cleaning web wound on the supply roller and transmit a cleaning web supply signal to the control system; and
    a drive system, wherein one of the two cleaning assemblies is in operation and another of the two cleaning assembly is in standby, the control system activating the drive system to place the standby cleaning assembly in operation and then place the operating cleaning assembly in standby when the cleaning web supply signal reaches a predetermined level.

2. The belt cleaning system of claim 1 wherein at least one of the cleaning web sub-assemblies is removably mounted to an associated cleaning assembly.

3. The belt cleaning system of claim 1 wherein the applicator of at least one of the cleaning assemblies has a cylindrical shape and is composed of a foam material or a ceramic material.

4. The belt cleaning system of claim 1 wherein the cleaning web of the first cleaning web sub-assembly is dry and the cleaning web of the second cleaning web sub-assembly is dry.

5. The belt cleaning system of claim 1 wherein the cleaning web of the first cleaning web sub-assembly is wetted with a cleaning liquid and the cleaning web of the second cleaning web sub-assembly is wetted with a cleaning liquid.

6. The belt cleaning system of claim 1 wherein the cleaning web of the first cleaning web sub-assembly is wetted with a cleaning liquid and the cleaning web of the second cleaning web sub-assembly is dry.

7. The belt cleaning system of claim 6 further comprising a gravity fed cleaning liquid supply sub-system including:
    a cleaning liquid supply;
    a receptacle having a holding trough;
    a supply line providing fluid communication between the cleaning liquid supply and the receptacle trough; and
    a wick having a proximal end portion disposed in the receptacle trough and a distal end portion adapted to contact the cleaning web or the conveyor belt carrier surface.

8. The belt cleaning system of claim 7 wherein the wick is composed of a hydroscopic cloth and or synthetic fiber.

9. The belt cleaning system of claim 7 wherein the cleaning liquid supply sub-system also includes a spring element adapted to bias the wick distal end portion into engagement with the conveyor belt carrier surface.

10. The belt cleaning system of claim 7 wherein the cleaning liquid supply sub-system also includes:
    a reservoir; and
    a reservoir level detector providing a cleaning liquid level indication.

11. The belt cleaning system of claim 10 wherein the cleaning liquid supply sub-system also includes:
    a supply line adapted to provide cleaning liquid to the reservoir;
    a control device disposed in the supply line; and
    a control system in communication with the reservoir level detector and the control device;
    wherein the control system opens the control device to automatically fill the reservoir when the cleaning liquid level reaches a predetermined value.

12. The belt cleaning system of claim 1 wherein the cleaning web sub-assembly of the first cleaning assembly also includes a housing, the supply roller and take-up roller being rotatably mounted within a housing.

13. The belt cleaning system of claim 1 wherein the cleaning web sub-assembly of the second cleaning assembly also includes a housing, the supply roller and take-up roller being rotatably mounted within a housing.

14. A method of cleaning a conveyor belt having a carrier surface with a belt cleaning system including first and second cleaning assemblies, each having a removable cleaning web sub-assembly including a supply roller, a take-up roller and a cleaning web extending from a supply of clean cleaning web wound on the supply roller to the take-up roller, the method comprising:

placing the cleaning system in operation including placing the first cleaning assembly in operation, whereby the cleaning web of the first cleaning assembly cleans the conveyor belt carrier surface, and placing the second cleaning assembly in standby;

monitoring the supply of clean cleaning web in the first cleaning assembly;

removing the first cleaning assembly from operation when the supply of clean cleaning web reaches a predetermined level, wherein removing the first cleaning assembly from operation includes placing the second cleaning assembly in operation, whereby the cleaning web of the second cleaning assembly cleans the conveyor belt carrier surface;

monitoring the supply of clean cleaning web in the second cleaning assembly;

removing the second cleaning assembly from operation when the supply of clean cleaning web reaches a predetermined level and then placing the first cleaning assembly in operation; and replacing the cleaning web sub-assembly in the second cleaning assembly.

15. A belt cleaning system to clean a conveyor belt having a carrier surface and moving in a direction of travel, the system comprising:

a first cleaning assembly including a cleaning web sub-assembly including:
        a supply roller;
        a take-up roller;
        a cleaning web extending from a supply of clean cleaning web wound on the supply roller to the take-up roller;
        an applicator disposed intermediate the supply roller and the take-up roller, the applicator being adapted to bias the cleaning web into contact with the conveyor belt carrier surface;

a second cleaning assembly positioned after the first cleaning assembly in the direction of travel of the conveyor belt, the second cleaning assembly including a cleaning web sub-assembly including:
        a supply roller;
        a take-up roller;
        a cleaning web extending from a supply of clean cleaning web wound on the supply roller to the take-up roller;
        an applicator disposed intermediate the supply roller and the take-up roller, the applicator being adapted to bias the cleaning web into contact with the conveyor belt carrier surface; and a gravity fed cleaning liquid supply sub-system including:
        a cleaning liquid supply,
        a receptacle having a holding trough,
        a supply line providing fluid communication between the cleaning liquid supply and the receptacle trough,
        a wick having a proximal end portion disposed in the receptacle trough and a distal end portion adapted to contact the conveyor belt carrier surface or the cleaning web of at least one of the cleaning assemblies, and
        a spring element adapted to bias the wick distal end portion into engagement with the conveyor belt carrier surface or the cleaning web of at least one of the cleaning assemblies, wherein the conveyor belt carrier surface or the cleaning web of at least one of the cleaning assemblies is wetted with a cleaning liquid.

* * * * *